(12) United States Patent
Han et al.

(10) Patent No.: US 8,928,603 B2
(45) Date of Patent: Jan. 6, 2015

(54) TOUCH PANEL AND INPUT RECOGNITION DEVICE USING THE TOUCH PANEL

(75) Inventors: Dong-Kyoon Han, Seongnam-si (KR); Sung-Soo Park, Suwon-si (KR); Myeong-Sil Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 704 days.

(21) Appl. No.: 13/008,307

(22) Filed: Jan. 18, 2011

(65) Prior Publication Data

US 2011/0175834 A1 Jul. 21, 2011

(30) Foreign Application Priority Data

Jan. 15, 2010 (KR) .................. 10-2010-0003952

(51) Int. Cl.
*G06F 3/041* (2006.01)
*G06F 3/044* (2006.01)

(52) U.S. Cl.
CPC ...... *G06F 3/044* (2013.01); *G06F 2203/04106* (2013.01); *G06F 2203/04111* (2013.01)
USPC .................. 345/173; 345/174; 178/18.01

(58) Field of Classification Search
CPC ........ G06F 3/044; G06F 3/0488; G06F 3/045
USPC .............. 345/158, 173–180; 178/18.01–18.04
See application file for complete search history.

(56) References Cited

U.S. PATENT DOCUMENTS

| 4,686,332 | A | * | 8/1987 | Greanias et al. | ............... 345/173 |
| 7,864,160 | B2 | * | 1/2011 | Geaghan et al. | ............... 345/173 |
| 2007/0285389 | A1 | * | 12/2007 | Ito | .................. 345/158 |
| 2009/0002338 | A1 | * | 1/2009 | Kinoshita et al. | ............. 345/174 |

FOREIGN PATENT DOCUMENTS

| JP | 2007-257164 | 10/2007 |
| JP | 2008-197757 | 8/2008 |

* cited by examiner

*Primary Examiner* — Kimnhung Nguyen
(74) *Attorney, Agent, or Firm* — The Farrell Law Firm, P.C.

(57) ABSTRACT

A touch panel is provided including at least one first electrode pattern including a plurality of electrode lines arranged in a first direction; and at least one second electrode pattern including a plurality of second electrode lines arranged in a second direction to intersect the first electrode lines; wherein the first electrode lines are spaced apart at different intervals from one another in the first direction.

17 Claims, 7 Drawing Sheets

TOUCH PANEL AND INPUT RECOGNITION DEVICE USING THE TOUCH PANEL

PRIORITY

This application claims priority under 35 U.S.C. §119(a) to an application entitled "Touch Panel And Input Recognition Device Using The Touch Panel" filed in the Korean Intellectual Property Office on Jan. 15, 2010, and assigned Serial No. 10-2010-0003952, the entire disclosure of which is incorporated herein by reference.

BACKGROUND OF THE INVENTION

1. Field of the Invention

The present invention generally relates to a touch panel, and, in particular, to a touch panel and an input recognition device using the touch panel, which are for accurately recognizing a pen input.

2. Description of the Related Art

In general, a touch panel is installed on a display surface of a display device such as a Liquid Crystal Display (LCD), and generates a voltage or current signal when a user touches and presses the touch panel with a stylus pen or a finger as the user is looking at the display device. Input types of such a touchscreen include a resistance film and a capacitance.

The resistance film type touchscreen senses direct contact of two thin conduction layers on the screen by pressure applied onto the layers by a user's finger or stylus pen, and it does not matter whether the subject of sensing is a conductor or a nonconductor. By contrast, in the capacitance type touchscreen, the subject of sensing should be a conductor, and a predetermined contact area is required in order to change the sensible capacitance. Accordingly, there is no problem with sensing the finger. However, in the case of a conductor tip, its touch area is small, and thus the touch may not be sensed and cause errors to occur frequently. Even in the capacitance type, a stylus pen having a conductor tip, which is adjacent to the screen and generates an electric signal, can be used so that a user interface or an input by writing for a precise coordinate designation is possible. In the case of using an electronic pen or a stylus pen which has a built-in battery and generates an electric signal, electrode patterns, which are different from the existing capacitance type that can sense only the finger touch, are used in the touchscreen panel. In this case, a mutual capacitance type is used as the sense type.

Figure 1:
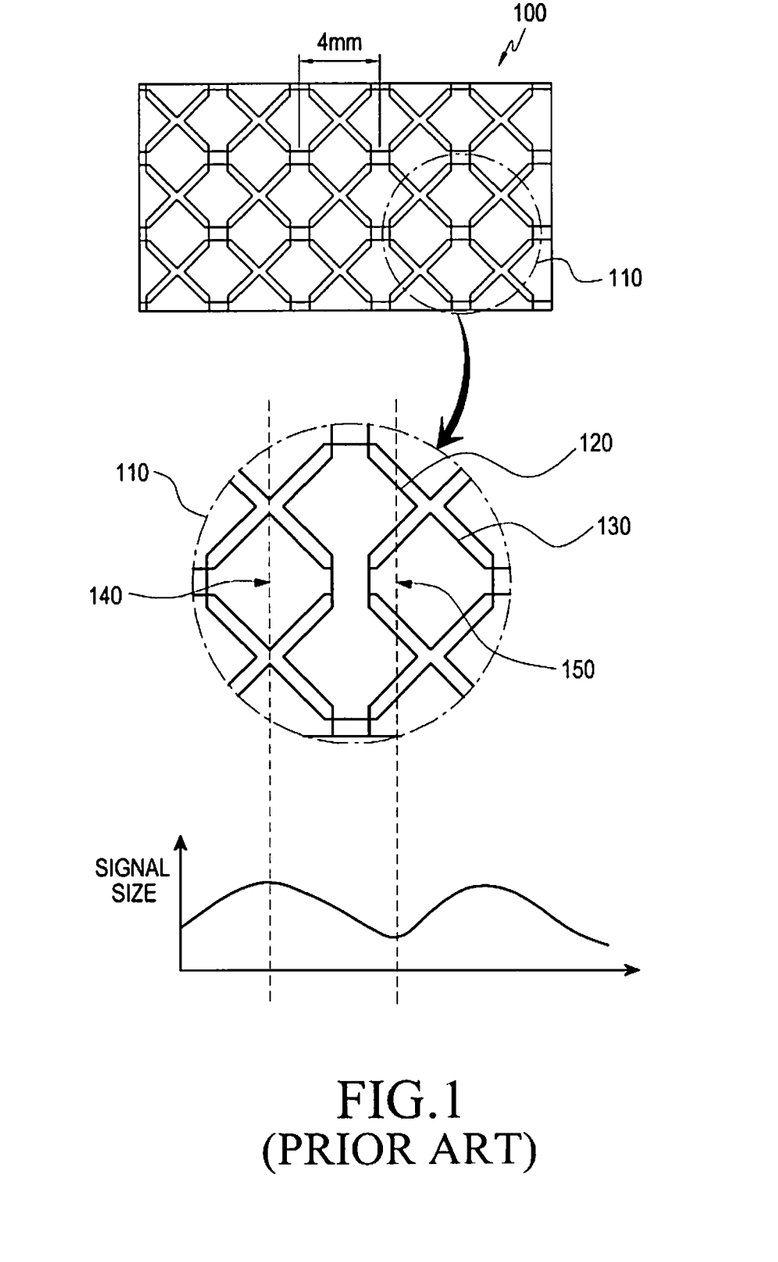
FIG. 1 illustrates an electrode pattern in a general self-capacitance type.

Accordingly, the capacitance type is divided into a self-capacitance type and a mutual capacitance type. A self-capacitance type touch panel has a structure, as illustrated in FIG. 1. FIG. 1 illustrates an example of an electrode pattern 100 that is used to sense a finger in a general self-capacitance type touch panel. According to a detailed structure 110 of a diamond-patterned electrode pattern 100, a first pattern 120 is formed in a first direction, and a second pattern 130 is formed in a second direction, which is perpendicular to the first direction. The first pattern 120 and the second pattern 130 intersect. In the case where a portion indicated by a reference numeral 140 and a portion indicated by a reference numeral 150 in the electrode pattern are touched, the capacitance is proportional to the area, and, thus, a difference in signal size may occur even though a portion on the same pattern 130 is touched. Due to this difference in signal size, a coordinate detection error may occur at a touch point.

Figure 2:
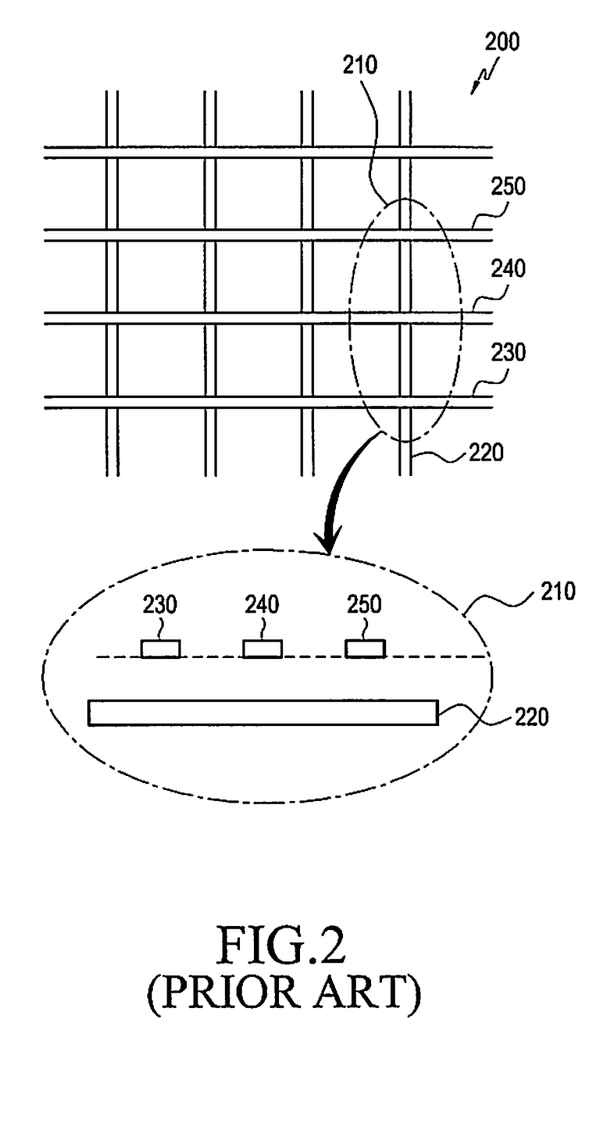
FIG. 2 illustrates an electrode pattern in a mutual capacitance type.

A mutual capacitance type touch panel has a structure as illustrated in FIG. 2. FIG. 2 illustrates an example of an electrode pattern 200 that is used to sense a stylus pen in a general mutual capacitance type touch panel. According to a detailed structure 210 of the lattice-patterned electrode pattern 200, as illustrated in FIG. 2, a first line 220 and second lines 230, 240, and 250 are formed in a first direction and in a second direction, respectively. In this type, as constituent elements, a transmission unit transmitting an electric field and a reception unit sensing the change of the electric field are dividedly provided to extract coordinates by sensing the change of the electric field that is caused by the contact of a conductor. If the intention is to sense the contact of a finger using this type, a method is used, which makes the electrode in the first direction function as the transmission unit and makes the electrode in the second direction function as the reception unit. If the intention is to sense the contact of a stylus pen, a method may be used, which makes the stylus pen itself serve to transmit the electric field instead of the electrode in the first direction. As described above, the touch panel of FIG. 2 has a structure that operates based on the mutual capacitance type.

SUMMARY OF THE INVENTION

As described above, in the case of the self-capacitance type, as illustrated in FIG. 1, a difference in signal size may occur, and thus, a coordinate detection error may occur. Also, in the case of the mutual capacitance type as illustrated in FIG. 2, a precise touch is possible using a stylus pen that serves as a transmission unit receiving the electricity, but power consumption becomes relatively large in comparison to the self-capacitance type. Thus, there is a need for a touch panel structure for the self-capacitance type irrespective of a touch input means such as a finger, a stylus pen, or the like.

Accordingly, the present invention has been made to solve the above-mentioned problems occurring in the prior art, and the present invention provides a touch panel and an input recognition device using the touch panel, which can accurately detect coordinate values by using a self-capacitance type.

In accordance with an aspect of the present invention, there is provided a touch panel, which includes at least one first electrode pattern including a plurality of electrode lines arranged in a first direction; and at least one second electrode pattern including a plurality of second electrode lines arranged in a second direction to intersect the first electrode lines; wherein the first electrode lines are spaced apart at different intervals from one another in the first direction.

In accordance with another aspect of the present invention, there is provided an input recognition device using a touch panel, which includes the touch panel including at least one first electrode pattern, including a plurality of electrode lines arranged in a first direction, and at least one second electrode pattern including a plurality of electrode lines arranged in a second direction to intersect the electrode lines in the first direction, wherein the electrode lines of the first or second electrode pattern are spaced apart at different intervals from one another in a corresponding one of the first and second directions, and output signals according to a touch input; a mode determination unit determining a touch input means based on an input signal through the touch panel, and outputting a sense signal by a finger touch and a sense signal by a stylus pen in accordance with the result of determination; and a control unit determining the touch and position of the touch input means by the signal output from the mode determination unit.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, the same elements will be designated by the same reference numerals although they are shown in different drawings. Further, various specific definitions found in the following description are provided only to help with the general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

The present invention provides a touch panel that can recognize a precise touch input based on a self-capacitance type. To accomplish this goal, the touch panel, according to an embodiment of the present invention, includes first electrode patterns including a plurality of electrode lines arranged in a first direction, and second electrode patterns including a plurality of electrode lines arranged in a second direction to intersect the electrode lines in the first direction. The first electrode patterns are formed to be separate in different spaces from the electrode lines having different widths, and the second electrode patterns have the same structure. According to the present invention, two input types by a finger and a stylus pen are determined through the touch panel, and a signal process is performed in accordance with the determined input type. As described above, by making widths and spaces of the respective lines different from one another, precise coordinate value detection is facilitated, and a user can perform a touch input irrespective of the touch input means.

Figure 3A:
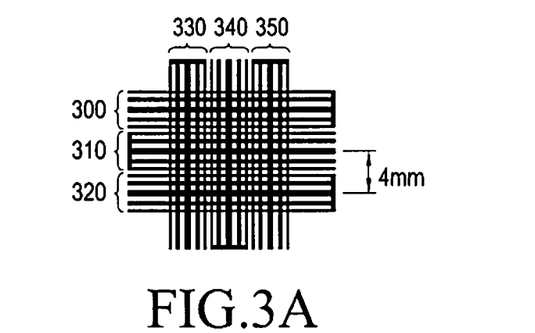
FIGS. 3A and 3B illustrate a plan structure of a touch panel according to an embodiment of the present invention.
Figure 3B:
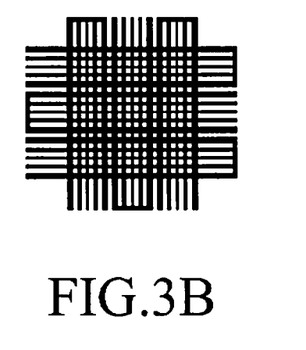

The structure of the touch panel, as described above, will be described in detail with reference to FIGS. 3A, 3B, and 4. FIGS. 3A and 3B illustrate a plan structure of a touch panel according to an embodiment of the present invention, and FIG. 4 illustrates a perspective view of a touch panel of FIG. 3.

First, referring to FIG. 3A, the touch panel is composed of straight electrode lines. The electrode lines are arranged in a horizontal direction and a vertical direction. If it is assumed that a space between the respective lines in the touch panel in the related art as illustrated in FIGS. 1 and 2 is, for example, 4 mm, corresponding to a space from the center of one electrode pattern 310 to the center of another electrode pattern 320 in the present invention. That is, the touch panel according to an embodiment of the present invention is configured such that, in a space where one lattice exists per unit space (for example, 4 mm) in the lattice pattern having the same space in the related art, a plurality of electrode lines are arranged. The dimension "4 mm" is merely an example for comparing the spaces between the existing lines, and the present invention is not limited to such dimensions.

Electrode patterns 300, 310, and 320 are positioned in the horizontal direction, while electrode patterns 330, 340, and 350 are positioned in the vertical direction. A flat plate by the electrode patterns in the horizontal direction and a flat plate by the electrode patterns in the vertical direction are not stacked, but form separated layers as illustrated in FIG. 4.

Figure 4:
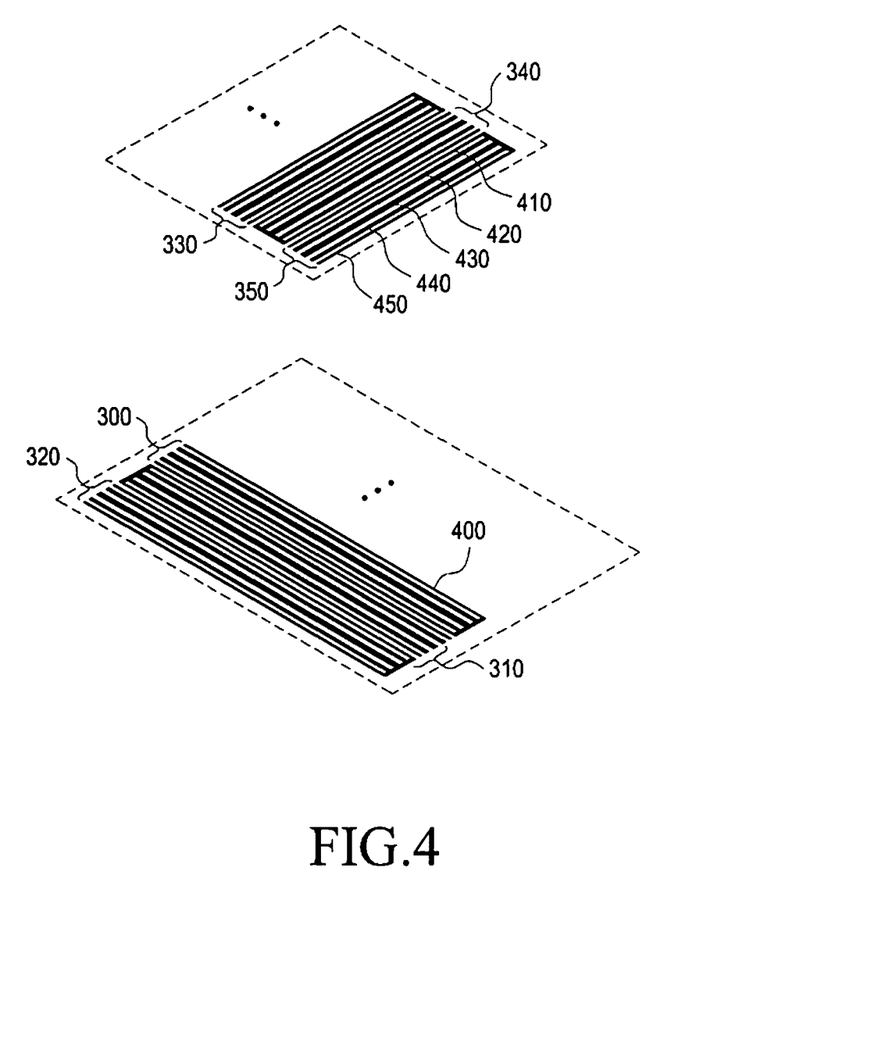
FIG. 4 illustrates a perspective view of a touch panel of FIG. 3.

Looking at the configuration of one electrode pattern, as illustrated in FIG. 4, one electrode pattern 350 includes a plurality of lines 410, 420, 430, 440, and 450. Accordingly, electrode patterns 330 and 340, which are in parallel to electrode pattern 350, are gathered to form one flat plate. The electrode patterns 300, 340, and 350 in the vertical direction form one flat plate, and the parallel electrode patterns 300, 310, and 320, which are perpendicular to the flat plate, form another flat plate. As described above, the present invention provides a touch panel structure in which the widths and spaces of the respective lines in one electrode pattern are changed for precise coordinate value detection even with the use of the self-capacitance type.

Accordingly, the plurality of lines 410, 420, 430, 440, and 450 that constitute the electrode pattern 350 have different widths. Specifically, FIG. 4 shows an electrode pattern in which the center line 430 among the plurality of lines 410, 420, 430, 440, and 450 has the widest width and the edge lines 410 and 450 have the narrowest width as an example. That is, the touch panel according to an embodiment of the present invention has an arrangement in which the line width is widest in the center and is gradually narrower toward the edge portions of the touch panel. Also, as to the space between the respective lines that form the electrode pattern, the space becomes narrower toward the center and becomes wider toward the edge portions.

Unlike this, as illustrated in FIG. 3B, the touch panel according to an embodiment of the present invention may be composed of electrode patterns which are arranged so that the line width is narrowest in the center and becomes wider toward the edge portions. In one electrode pattern, the respective lines are arranged such that the space between the electrode lines is widest in the center and is narrowest in the edge portions.

Figure 5:
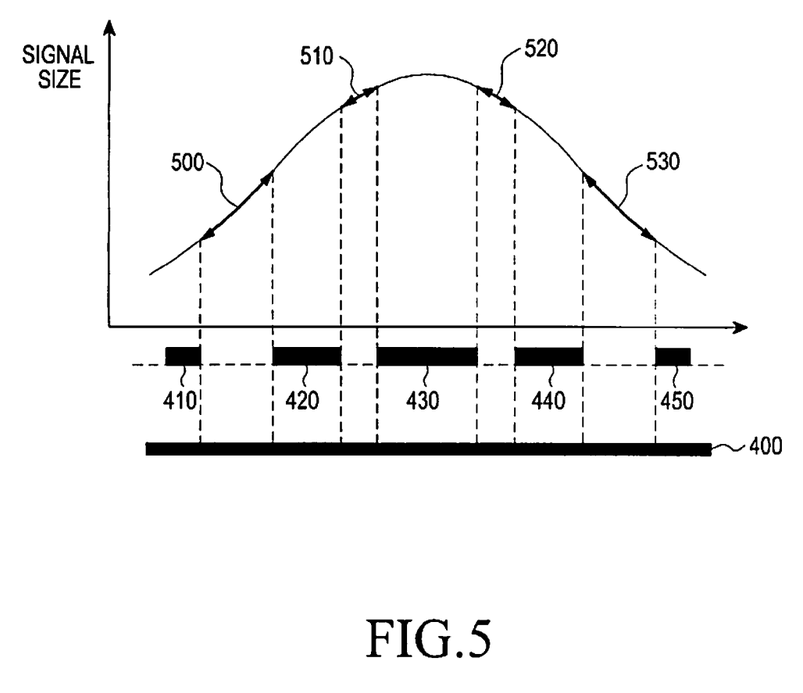
FIG. 5 illustrates a signal difference according to an electrode pattern in a touch panel according to an embodiment of the present invention.

In the case of a touch panel having the above-described structure, the widths and the spaces of the respective lines are different, and thus a signal in the form as illustrated in FIG. 5 is output. FIG. 5 is a diagram illustrating a signal difference according to an electrode pattern in a touch panel according to an embodiment of the present invention. The signal size as shown in FIG. 5 is caused by one electrode 400 composed of electrode lines 410 to 450, and thus is considered as a distribution of contribution values by the respective electrode elements rather than the actually sensed values.

FIG. 5 illustrates a cross-section of a touch panel in which electrode lines 410, 420, 430, 440, and 450 having different widths in the vertical direction are arranged around one line 400 of the electrode pattern 300 in the horizontal direction. In this cross-section, the center line 430 has the widest width, and lines 420 and 440 having a width that is narrower than that of the center line are arranged on both sides of the center line 430. Moreover, in edge portions, lines 410 and 450 having the narrowest width are arranged. In the case of the electrode pattern in which the center line has the widest width, the spaces among the respective lines are different from one another as illustrated in FIG. 5. That is, the space becomes narrower toward the center, and becomes wider toward the edge portions.

Due to this difference in space, signals having different shapes, such as a signal 500 between the lines 410 and 420, a signal 510 between the lines 420 and 430, a signal 520 between the lines 430 and 440, and a signal 530 between the lines 440 and 450, are output. As described above, since different types of signals are sensed due to the different widths and spaces of the respective lines, the lines can be easily discriminated using the structure of the touch panel, and thus a precise position determination becomes possible. In other words, by dividing one existing electrode into several electrodes having different widths and spaces between the electrodes, the sizes of the signals sensed by the electrodes are distributed to reflect different contributions according to the spaces, and thus a precise coordinate detection becomes possible through a stylus pen that generates an electric signal or a touch input means such as a conductor. Further, since the touch panel, according to an embodiment of the present invention, has a structure that generates capacitance between the electrode pattern in the horizontal direction and the electrode pattern in the vertical direction, it is also possible to sense the finger touch in the same manner as the self-capacitance type.

Figure 6:
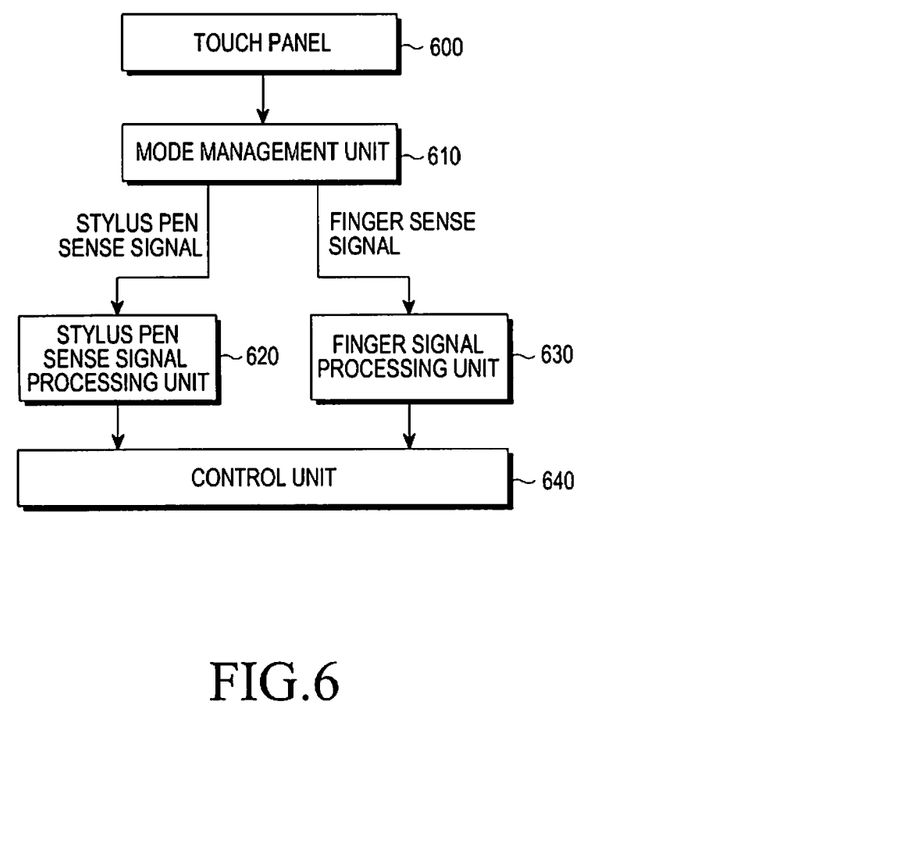
FIG. 6 is a block diagram illustrating the internal configuration of an input recognition device having a touch panel according to an embodiment of the present invention.

The configuration and operation of the input recognition device for sensing a user's touch input using a touch panel having the above-described structure will be described with reference to FIGS. 6 and 7. FIG. 6 is a block diagram illustrating the internal configuration of an input recognition device having a touch panel according to an embodiment of the present invention.

Referring to FIG. 6, a touch panel 600 has a structure as illustrated in FIG. 3, and a mode management unit 610 determines whether to operate in a self-capacitance type mode for sensing a finger touch or in a mode for sensing an access and touch of a stylus pen, in accordance with the touch input signal though the touch panel 600 to operate in a determined mode.

For this, the mode management unit 610 determines the touch input means based on the input signal through the touch panel, and determines whether the input signal is a sense signal according to the access or touch of the stylus pen or a finger sense signal by the finger touch. Here, the stylus pen may be an active stylus pen which has a built-in battery and generates a voltage of a predetermined frequency or a passive stylus having a conductor tip with a predetermined area. In the case where a pulse type signal is input through the touch panel 600 by the active stylus pen, the stylus pen sense signal is determined by sensing the change of a difference in electric signal between neighboring electrodes. That is, the mode management unit 610 determines whether the input signal is a finger sense signal or a stylus pen sense signal based on the pattern of the input signal.

A stylus pen sense signal processing unit 620 performs time division and averaging of the stylus pen sense signal, and transfers the processed signal to the control unit 640. Through the processing of the stylus pen sense signal processing unit 620, a final coordinate value is output to the control unit 640. Here, since the processing of the stylus pen sense signal is the operation according to the processing of a general active stylus pen sense signal, the detailed description thereof will be omitted. In the same manner, a finger signal processing unit 630 processes the finger sense signal transferred from the mode management unit 610, and outputs the corresponding coordinate value to the control unit 640. The control unit 640 then determines the touch and position of the touch input means, for example, a finger or stylus pen. Accordingly, the control unit 640 displays a command according to the coordinate value on the touchscreen or performs an operation such as display of the contents.

Since a stylus is equal to a finger in that it is a conductor having a predetermined area, it is configured to process the signal only with the finger signal processing unit. However, a software processing unit that determines and processes the finger and the stylus according to the area of the stylus tip may be provided in the process.

Figure 7:
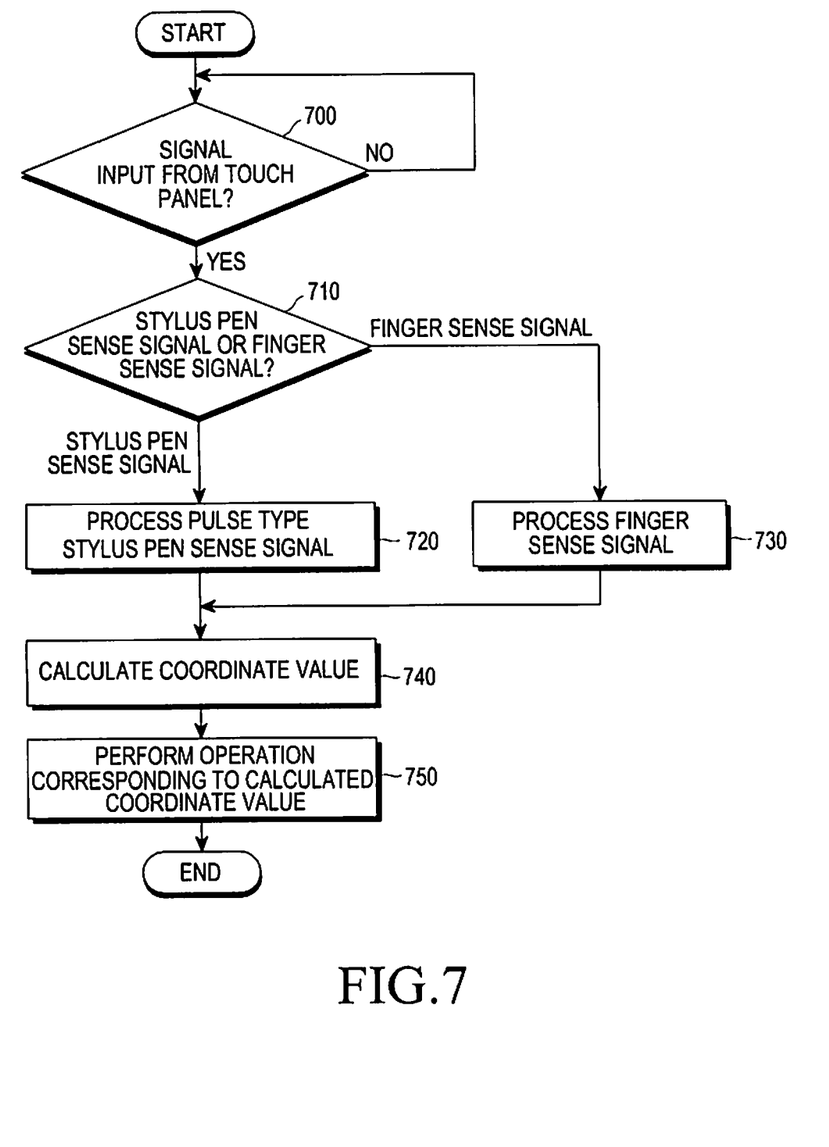
FIG. 7 is a flowchart illustrating an operation of an input recognition device having a touch panel according to an embodiment of the present invention.

The operation of the input recognition device having the touch panel with the above-described configuration is as illustrated in FIG. 7.

Referring to FIG. 7, if a signal is input from the touch panel in step 700, it is determined whether the input signal is a stylus pen sense signal or a finger sense signal. If the input signal is the stylus pen sense signal, the pulse type stylus pen sense signal is processed in step 720, while if the input signal is the finger sense signal, the finger sense signal for calculating the coordinate value is performed. By performing the above-described signal process, the coordinate value is calculated in step 740, and the operation corresponding to the calculated coordinate value is performed in step 750.

As described above, by using the touch panel composed of electrode patterns in which electrode lines having different widths and spaces are arranged, both the finger touch and the active stylus pen touch can be sensed.

According to the present invention, by making the widths and spaces of the respective lines be different from one another, the input sensitivity at a touch point is improved, and thus a more precise coordinate value can easily be detected. Moreover, since both the finger touch and the stylus pen access and touch can be sensed, a user can perform a touch input irrespective of the touch input means such as the finger, stylus pen, and the like.

While the operation and configuration of the touch panel and the input recognition device using the touch panel have been shown and described with reference to certain embodiments thereof, it will be understood by those skilled in the art that various changes in form and details may be made therein without departing from the spirit and scope of the invention as defined by the appended claims and their equivalents.

What is claimed is:
1. A touch panel comprising:
at least one electrode pattern including a plurality of electrode lines arranged in a direction,
wherein the plurality of electrode lines includes a center electrode line and two electrode lines positioned on each side of the center electrode line,
wherein first spaces separate the center electrode line from each adjacent electrode line,
wherein second spaces separate each adjacent electrode line from next electrode lines on respective sides opposite the center electrode line,
wherein the first spaces are smaller than the second spaces,
wherein the at least one electrode pattern is arranged so that the center electrode line is wider than each adjacent electrode line, and
wherein each of the first spaces is constant over a full length of the center electrode line, and each of the second spaces is constant over a full length of each adjacent electrode line.
2. The touch panel of claim 1, wherein the adjacent electrode lines have a same width, the next electrode lines have a same width, and a width of the center electrode line is different from each of the adjacent electrode lines and the width of the next electrode lines.

3. The touch panel of claim 1, further comprising a plurality of additional electrode lines arranged in a direction crossing the direction of the plurality of electrode lines.

4. The touch panel of claim 1, wherein each of the center electrode line, the adjacent electrode lines and the next electrode lines has a constant width over a full length thereof.

5. A touch panel comprising:
at least one electrode pattern including a plurality of electrode lines arranged in a direction,
wherein the plurality of electrode lines includes a center electrode line and two electrode lines positioned on each side of the center electrode line,
wherein first spaces separate the center electrode line from each adjacent electrode line,
wherein second spaces separate each adjacent electrode line from next electrode lines on respective sides opposite the center electrode line,
wherein the first spaces are larger than the second spaces, and
wherein each of the first spaces is constant over a full length of the center electrode line, and each of the second spaces is constant over a full length of each adjacent electrode line.

6. The touch panel of claim 5, wherein the plurality of electrode lines have different widths, arranged to become wider toward an edge portion of the at least one electrode pattern and narrower at a center of the at least one electrode pattern.

7. The touch panel of claim 6, wherein a space between the plurality of electrode lines has different widths, with the space wider at a center of the at least one electrode pattern and narrower at an edge portion of the at least one electrode pattern.

8. The touch panel of claim 5, wherein a flat plate formed by the at least one electrode pattern and a flat plate formed by an additional electrode pattern form separate layers.

9. The touch panel of claim 5, wherein each of the center electrode line, the adjacent electrode lines and the next electrode lines has a constant width over a full length thereof.

10. An input recognition device using a touch panel, comprising:
the touch panel, including at least one electrode pattern including a plurality of electrode lines arranged in a direction, with the plurality of electrode lines including a center electrode line and two electrode lines positioned on each side of the center electrode line, wherein first spaces separate the center electrode line from each adjacent electrode line, second spaces separate each adjacent electrode line from next electrode lines on respective sides opposite the center electrode line, the first spaces are smaller than the second spaces, and the touch panel is configured to output signals according to a touch input;
a mode determination unit, configured to determine a touch input based on a signal input through the touch panel, configured to output a sense signal by a finger touch or a sense signal by a stylus pen in accordance with the result of determination; and
a control unit, configured to determine the touch and position of the touch input by the signal output from the mode determination unit,
wherein the at least one electrode pattern is arranged so that the center electrode line is wider than each adjacent electrode line, and
wherein each of the first spaces is constant over a full length of the center electrode line, and each of the second spaces is constant over a full length of each adjacent electrode line.

11. The input recognition device of claim 9, wherein the adjacent electrode lines have a same width, the next electrode lines have a same width, and a width of the center electrode line is different from each of the adjacent electrode lines and the width of the next electrode lines.

12. The input recognition device of claim 10, wherein each of the center electrode line, the adjacent electrode lines and the next electrode lines has a constant width over a full length thereof.

13. An input recognition device comprising:
a touch panel, which includes at least one electrode pattern including a plurality of electrode lines arranged in a direction, with the plurality of electrode lines including a center electrode line and two electrode lines positioned on each side of the center electrode line, wherein first spaces separate the center electrode line from each adjacent electrode line, second spaces separate each adjacent electrode line from next electrode lines on respective sides opposite the center electrode line, the first spaces are larger than the second spaces, and the touch panel is configured to output signals according to a touch input;
a mode determination unit configured to determine a touch input based on a signal input through the touch panel and configured to output a sense signal by a finger touch and a sense signal by a stylus pen in accordance with the result of determination; and
a control unit configured to determine the touch and position of the touch input by the signal output from the mode determination unit,
wherein each of the first spaces is constant over a full length of the center electrode line, and each of the second spaces is constant over a full length of each adjacent electrode line.

14. The input recognition device of claim 13, wherein the plurality of electrode lines have different widths, arranged to become wider toward an edge portion of the at least one electrode pattern and narrower at a center of the at least one electrode pattern.

15. The input recognition device of claim 14, wherein a space between the plurality of electrode lines has different widths, wider at a center of the at least one electrode pattern and narrower at an edge portion of the at least one electrode pattern.

16. The input recognition device of claim 13, wherein a flat plate formed by the at least one electrode pattern and a flat plate formed by an additional electrode pattern form separate layers.

17. The input recognition device of claim 13, wherein each of the center electrode line, the adjacent electrode lines and the next electrode lines has a constant width over a full length thereof.

* * * * *